US005985076A

United States Patent [19]

Misuda et al.

[11] Patent Number: 5,985,076

[45] Date of Patent: Nov. 16, 1999

[54] COATED PAPER AND METHODS FOR ITS PREPARATION

[75] Inventors: Katsutoshi Misuda; Nobuyuki Yokota; Sumito Terayama, all of Yokohama, Japan

[73] Assignee: Asahi Glass Company Ltd., Tokyo, Japan

[21] Appl. No.: 08/912,064

[22] Filed: Aug. 15, 1997

Related U.S. Application Data

[62] Division of application No. 08/523,623, Sep. 5, 1995, abandoned.

[30] Foreign Application Priority Data

Sep. 9, 1994 [JP] Japan .................................... 6-216302

[51] Int. Cl.[6] .......................... B44C 1/165; B29B 1/165; B32B 31/00; B05C 11/02

[52] U.S. Cl. .......................... 156/230; 156/242; 156/247; 118/100; 118/101

[58] Field of Search .................................... 156/230, 242, 156/247, 272.2, 289; 118/76, 100, 101, 200, 202, 212, 243; 427/194, 218

[56] References Cited

U.S. PATENT DOCUMENTS

| | | | |
|---|---|---|---|
| 4,374,077 | 2/1983 | Kerfeld | 264/22 |
| 4,906,315 | 3/1990 | McGrew | 156/231 |
| 5,104,730 | 4/1992 | Misuda et al. | 428/304.4 |
| 5,264,275 | 11/1993 | Misuda et al. | 428/304.4 |
| 5,463,178 | 10/1995 | Suzuki et al. | 428/216 |
| 5,472,773 | 12/1995 | Misuda et al. | 428/195 |
| 5,576,088 | 11/1996 | Ogawa et al. | 428/327 |
| 5,597,613 | 1/1997 | Galarneau et al. | 427/162 |
| 5,635,008 | 6/1997 | Bianchi et al. | 156/247 |

FOREIGN PATENT DOCUMENTS

| | | |
|---|---|---|
| 0180396 | 5/1986 | European Pat. Off. . |
| 0529308 | 3/1993 | European Pat. Off. . |
| 0634287 | 1/1995 | European Pat. Off. . |
| 3-215081 | 9/1991 | Japan . |

OTHER PUBLICATIONS

G. A. Smook, pp. 266–269, "Handbook for Pulp & Paper Technologists", 1982.

Database WPI, Section Ch, Week 9144, Derwent Publications Ltd., London, GB; Class G05, AN 91–321353 & JP–A–3 215 081 (Asahi Glass Co.Ltd.) Sep. 20, 1991 *abstract*.

*Primary Examiner*—Richard Crispino
*Assistant Examiner*—J. A. Lorengo
*Attorney, Agent, or Firm*—Oblon, Spivak, McClelland, Maier & Neustadt, P.C.

[57] ABSTRACT

A coated paper comprising a paper substrate, a pseudo-boehmite layer formed on the substrate and a silica layer laminated on the pseudo-boehmite layer, said coated paper having a 60° specular glossiness of at least 30% as stipulated in ISO 2813.

12 Claims, No Drawings

COATED PAPER AND METHODS FOR ITS PREPARATION

This application is a Division of application Ser. No. 08/523,623, filed on Sep. 5, 1995, now abandoned.

The present invention relates to a coated paper, particularly a coated paper suitable for recording by an ink jet printer, and methods for its preparation.

In recent years, reflecting wide use of electronic still cameras and computers, the hard copy technology to record images thereof on paper sheets has been rapidly developed. The ultimate target of such hard copy technology is a level equivalent to silver halide photography, and it is an objective for development to bring the color reproducibility, the resolution, the gloss, the weather resistance, etc. as close as possible to the levels of silver halide photography. For hard copy recording, various systems are available including not only the system wherein a display indicating an image is directly photographed by silver halide photography, but also a sublimation type thermal transfer system, an ink jet system, and an electrostatic transfer system.

An ink jet system printer has been widely used in recent years, since full coloring is thereby easy, and the printing noise is thereby low. In this system, ink liquid drops are ejected at a high speed from a nozzle to a recording material, and the ink contains a large amount of a solvent. Therefore, the recording material for an ink jet printer is required to swiftly absorb the ink and have excellent color forming properties. Therefore, a recording sheet having a porous layer of alumina hydrate formed on a substrate has, for example, been proposed in e.g. U.S. Pat. No. 5,104,730.

When gloss is required for a recording sheet for an ink jet printer, a glossy paper having an ink receiving layer of a resin type formed on a substrate, is known. In the ink jet recording system, a large amount of a solvent is contained in the ink to prevent clogging of the nozzle. Accordingly, after printing, the ink receiving layer may sometimes be swelled by the influence of the solvent, and particularly in the case of an ink-receiving layer of a resin type, glossiness may sometimes decreases.

It is an object of the present invention to present a coated paper which is excellent in the ink absorptivity and has high color reproducibility and which at the same is excellent in the surface gloss with a glossy surface having excellent scratch resistance.

Thus, the present invention provides a coated paper comprising a paper substrate, a pseudo-boehmite layer formed on the substrate and a silica layer laminated on the pseudo-boehmite layer, said coated paper having a 60° specular glossiness of at least 30% as stipulated in ISO 2813.

Now, the present invention will be described in further detail with reference to the preferred embodiments.

The 60° specular glossiness is the one stipulated in ISO 2813. In the coated paper of the present invention, the 60° specular glossiness is preferably at least 40%.

In the coated paper of the present invention, the pseudo-boehmite is colloidal aggregates of crystals of boehmite (compositional formula: $Al_2O_3 \cdot nH_2O$, wherein n=1 to 1.5). Preferably, it contains a binder. With respect to its pore characteristics, it is preferred that the average pore radius is from 3 to 50 nm, and the pore volume is within a range of from 0.5 to 1.0 $cm^3/g$.

As the pseudo-boehmite layer, the coated amount is preferably within a range of from 5 to 30 $g/m^2$. If the coated amount is less than 5 $g/m^2$, the ink absorptivity tends to be low, or the glossiness tends to be poor under the influence of the surface roughness of the substrate. On the other hand, if the coated amount exceeds 30 $g/m^2$, not only pseudo-boehmite is unnecessarily consumed, but also the strength of the pseudo-boehmite layer tends to be impaired.

On the pseudo-boehmite layer, a silica layer is laminated. The silica layer preferably has a structure in which fine silica particles with an average particle size of from 20 to 200 nm are bound by a binder. With respect to its pore characteristics, it is preferred that the average pore radius is from 5 to 20 nm, and the pore volume is within a range of from 0.5 to 1.5 $cm^3/g$.

As the silica layer, the coated amount is preferably within a range of from 0.1 to 3 $g/m^2$. If the coated amount is less than 0.1 $g/m^2$, the glossiness tends to be poor under the influence of the surface roughness of the substrate, and it tends to be difficult to obtain adequate effects for improving the scratch resistance. On the other hand, if the coated amount exceeds 3 $g/m^2$, the ink absorptivity tends to be low, such being undesirable.

The substrate paper is not particularly limited, and various papers may be used. It may be a paper which contains a filler other than pseudo-boehmite. Such a filler may be internally loaded or may be incorporated in the form of a layer beneath the pseudo-boehmite layer. The filler is not particularly limited. It is preferred to employ a porous silica, since the absorptivity will thereby be particularly good. When porous silica is to be used as the filler, it is preferred to employ a fine granular silica gel having a pore radius of from 4 to 25 nm and a pore volume of from 0.8 to 2.5 $cm^3/g$. In such a case, the coated amount of the porous silica filler is preferably within a range of from 5 to 10 $g/m^2$.

The coated paper of the present invention can be prepared preferably by coating a silica coating solution, e.g. a silica coating solution comprising a silica sol and a binder, on a flat and smooth die surface, closely contacting a paper substrate on the silica-coated layer, followed by drying to form a silica layer from the silica-coated layer, and peeling the paper substrate from the die to transfer the silica layer onto the paper. Here, as the substrate paper, a paper having a pseudo-boehmite layer formed thereon is employed, and it is necessary to closely contact the pseudo-boehmite layer to the silica-coated layer.

The method for forming the pseudo-boehmite layer on the paper substrate is not particularly limited. However, it is preferred, for example, to coat a coating solution containing from 5 to 50 parts by weight of a binder, per 100 parts by weight of the solid content of the pseudo-boehmite and having an overall solid content concentration of from 5 to 30 wt %. The solvent for the coating solution is preferably of an aqueous type from the viewpoint of the handling efficiency. As the binder, an organic binder made of a high molecular weight compound may preferably be employed, such as starch or its modified product, polyvinyl alcohol or its modified product, styrene-butadien rubber latex, acrylonitrile-butadiene rubber latex, carboxymethyl cellulose, hydroxymethyl cellulose or polyvinyl pyrrolidone.

After the pseudo-boehmite coated layer has been completely dried, a silica layer may be formed thereon. However, it is preferred to laminate the silica layer while the boehmite-coated layer still contains water to some extent. For this purpose, it is preferred that after coating the pseudo-boehmite coating solution on the paper substrate, it is dried to control the water content. The water content (water/solid content) in this coated layer is preferably controlled to a level of from 100 to 450 wt %.

For the composition of the silica coating solution, it is preferred that the coating solution preferably contains from 5 to 50 parts by weight of a binder per 100 parts by weight of the silica content, and the overall solid content concentration is from 5 to 30 wt %. The solvent for the coating solution is preferably of an aqueous type from the viewpoint of the handling efficiency. When a silica sol is to be used, it is preferred to employ the one having an average particle diameter of from 10 to 90 nm and a solid content of from 1 to 20 wt %. The silica sol may be acidic or alkaline. As the binder, the same type as used for the formation of the pseudo-boehmite porous layer, can be suitably employed. However, silanol-modified polyvinyl alcohol is particularly preferred.

The material of the die is not particularly limited, and it may be a plastic such as polyethylene terephthalate or polycarbonate, or a metal. The shape of the die may not only be a flat plate shape but also be a roll-shape or a flexible film form, so long as the surface is flat and smooth.

The manner of coating the silica coating solution on the die is not particularly limited, and various methods may be employed. After coating the coating solution on the die, the water content is preferably adjusted by drying. The water content (water/solid content) in this coating layer is preferably adjusted at a level of from 200 to 400 wt %. To the coated layer thus prepared, the pseudo-boehmite coated layer side of the paper substrate is closely contacted, followed by drying. When the water content of the coated layer becomes preferably at a level of not higher than 5 wt %, the substrate is peeled from the die, whereby the silica layer will be transferred to the paper substrate.

The method of the present invention can be carried out not only by a batch system but also by a continuous system using a rotating roll-shaped die.

Otherwise, the coated paper of the present invention can be prepared also by coating a silica-coating solution on the pseudo-boehmite layer side of the paper substrate having the pseudo-boehmite layer, followed by pressing a heated flat and smooth die to the silica-coated layer, to form a silica layer having its surface flattened and smoothed. In this case, the pseudo-boehmite coating solution may be the same as described above. The coating method is not particularly limited, and various methods may be employed. When pressing the die, it is preferred that the solvent is not completely removed from the pseudo-boehmite layer. When the drying degree of the coated layer is too much, it is preferred to apply a solvent to the coated layer by e.g. spraying before pressing the die. The amount of the solvent in such a case is at a level of from 30 to 200 wt % relative to the solid content of the coated layer.

When the die is not heated, it tends to take time for flattening, or the pseudo-boehmite layer is likely to be broken. Therefore, it is necessary that the die is heated to a level of from 50 to 150° C. The die may have various shapes including a flat plate shape and a roll-shape, and its material is not particularly limited. In the case of roll-type, the pressure for pressing is preferably at a level of a linear pressure of from 2 to 50 kg/cm.

It is preferred that the pseudo-boehmite layer or silica layer contains at least one compound selected from the group consisting of dithiocarbamates, thiurams, thiocyanate esters, thiocyanates and hindered amines, since fading of ink during the storage after printing can be prevented.

As the dithiocarbamates, potassium dimethyldithiocarbamate and sodium diethyldithiocarbamate may, for example, be preferably employed. As the thiurams, tetraethylthiuram disulfide and tetramethylthiuram monosulfide may, for example, be preferably employed. As the thiocyanate esters, methyl thiocyanate and ethyl thiocyanate may, for example, be preferably employed. As the thiocyanates, sodium thiocyanate and potassium thiocyanate may, for example, be preferably employed. Among them, sodium thiocyanate is particularly preferred.

The content of such an anti-fading agent is preferably from 0.01 to 10 wt %, based on the weight of the pseudo-boehmite layer or silica layer. If the content of the anti-fading agent is less than 0.01 wt %, its effects can not adequately be obtained, and fading of ink is likely to occur, such being undesirable. On the other hand, if the content of the anti-fading agent exceeds 10 wt %, the absorptivity of the porous layer tends to impaired. More preferably, the content of the anti-fading agent is from 0.1 to 1 wt %.

As a method for applying the anti-fading agent, a method is preferably employed wherein a solution having the anti-fading agent dissolved in the suitable solvent, is applied to a preliminarily formed pseudo-boehmite layer or silica layer by a dipping method or a spraying method. Otherwise, a method of preliminarily mixing the anti-fading agent to the starting material for forming the pseudo-boehmite layer or silica layer, may also be employed.

Now, the present invention will be described in further detail with reference to Examples. However, it should be understood that the present invention is by no means restricted to such specific Examples.

EXAMPLE 1

To 100 parts by weight (calculated as the solid content) of a boehmite sol having an average agglomerated particle diameter of 150 nm (the average pore radius of the xerogel of pseudo-boehmite obtainable by removing the solvent from this sol was 9.2 nm), 11 parts by weight of polyvinyl alcohol was added, and water was further added to obtain a boehmite coating solution having a total solid content concentration of 15 wt %. This coating solution was coated by a bar coater on a substrate made of wood free paper having a weight of 157 $g/m^2$ so that the coated amount after drying would be 20 $g/m^2$. The water content (water/solid content) immediately after coating was 566 wt %. This was dried, so that the water content was reduced to 300 wt %.

On this coated layer, a silica sol coating solution having a solid content of 4 wt % (polyvinyl alcohol/$SiO_2$=0.1) which was prepared by adding water to a silica sol having an average primary particle diameter of from 35 to 45 nm (Cataroid SI-45P, tradename, manufactured by Catalysts and Chemicals Ind. Co., Ltd.) and a silanol-modified polyvinyl alcohol (PVA-R1130, tradename, manufactured by KURARAY CO., LTD.), was coated. The coated amount was 1 $g/m^2$ as the coated amount after drying. The water content of the silica sol-coated layer immediately after coating, was 425 wt %.

To this coated layer in the wet state, a cylindrical die having a specular surface heated to 90° C, was closely contacted under a linear pressure of 10 kg/cm, followed by drying to obtain a coated paper having a pseudo-boehmite layer on the paper substrate and a silica layer thereon. The 60° specular glossiness of this coated paper was 52%.

EXAMPLE 2

A coated paper was prepared in the same manner as in Example 1 except that in Example 1, the silica sol was changed to a silica sol having an average primary particle diameter of from 70 to 90 nm (Cataroid SI-80P, tradename, manufactured by Catalysts and Chemicals Ind. Co., Ltd.). The 60° specular glossiness of this coated paper was 52%.

EXAMPLE 3

To 100 parts by weight of silica gel powder having an average particle size of 3 μm (Carplex FPS3, tradename, manufactured by Shionogi & Co., Ltd.), 11 parts by weight of polyvinyl alcohol was added, and water was further added, to obtain a silica coating solution having a total solid content concentration of 12 wt %. This coating solution was coated by a bar coater on an art paper having a weight of 105 $g/cm^2$ so that the coated amount after drying would be 8 $g/m^2$, followed by drying to obtain a base paper having a porous silica-coated layer.

A pseudo-boehmite coating solution and a silica sol coating solution were coated in the same manner as in Example 1 except that this base paper was used instead of the wood free paper in Example 1. The pseudo-boehmite layer was formed on the porous silica-coated layer of the base paper. As a result, a coated paper having a porous silica layer on the paper substrate, a pseudo-boehmite layer thereon and further a silica layer thereon, was obtained. The 60° specular glossiness of this coated paper was 55%.

EXAMPLE 4

To 100 parts by weight (calculated as the solid content) of a boehmite sol having an average agglomerated particle diameter of 175 nm (the average pore radius of the xerogel of pseudo-boehmite obtainable by removing the solvent from this sol was 10.5 nm), 13 parts by weight of polyvinyl alcohol was added, and water was further added, to obtain a boehmite coating solution having a total solid content concentration of 15 wt %. This coating solution was coated by a bar coater on a substrate made of a polyethylene terephthalate film having a thickness of 100 $\mu$m, so that the coated amount after drying would be 20 $g/m^2$. The water content (water/solid content) immediately after coating was 566 wt %. This was dried, so that the water content was reduced to 370 wt %.

On this coated surface, a wood free paper having a weight of 128 $g/m^2$ was overlaid and closely contacted by a roller under a linear pressure of 10 kg/cm, followed by further drying until the water content of the coated layer became not higher than 5 wt %. Then, the polyethyleneterephthalate film was peeled, whereby the coated layer was completely transferred onto the wood free paper to obtain a coated paper.

On this coated layer, a silica sol coating solution having a solid content of 4 wt % (polyvinyl alcohol/$SiO_2$=0.1) which was prepared by adding water to a silica sol having an average primary particle diameter of from 40 to 50 nm (Snowtex OL, tradename, manufactured by Nissan Chemical Industries, Ltd.) and a silanol-modified polyvinyl alcohol (PVA-R1130, tradename, manufactured by KURARAY CO., LTD.), was coated. The coated amount was 1.5 $g/m^2$ as the coated amount after drying. The water content of the silica sol-coated layer immediately after coating was 325 wt %.

To this coated layer in a wet state, a cylindrical die having a specular surface heated to 90° C, was closely contacted under a linear pressure of 10 kg/cm, to obtain a coated paper having a pseudo-boehmite layer on the paper substrate and further a silica layer thereon. The 60° specular glossiness of this coated paper was 53%.

COMPARATIVE EXAMPLE

A coated paper was prepared in the same manner as in Example 1 except that the silica layer as the top layer was not provided. The 60° specular glossiness of this coated paper was 43%.

The coated papers obtained by the Examples and the coated paper obtained by the Comparative Example were subjected to 10 times abrasion tests by using an abrasion tester (manufactured by Suga Shikenki K. K.), whereby the respective coated papers of the Examples were found to be hardly scratchable and thus have good abrasion resistance as compared with the coated paper of the Comparative Example. With these coated papers, it was also possible to obtain records with excellent image quality by an ink jet printer.

We claim:

1. A method for preparing a coated paper, which comprises coating a silica coating solution on a flat and smooth die surface, closely contacting thereto a pseudo-boehmite layer of a paper substrate having the pseudo-boehmite layer thereon, followed by drying to form a silica layer on the pseudo-boehmite layer, and then releasing the paper substrate from the die to transfer the silica layer onto the paper substrate, wherein the formed silica layer has a 60° specular glossiness of at least 30% as stipulated in ISO 2813.

2. The method according to claim 1, wherein the pseudo-boehmite layer has an average pore radius of from 3 to 15 nm and a pore volume of from 0.5 to 1.0 $cm^3/g$.

3. The method according to claim 1, wherein the coated amount of the pseudo-boehmite layer is from 5 to 30 $g/m^2$.

4. The method according to claim 1, wherein the silica layer comprises silica particles having an average particle size of from 20 to 200 nm bound by a binder.

5. The method according to claim 1, wherein the silica layer has an average pore radius of from 5 to 20 nm and a pore volume of from 0.5 to 1.5 $cm^3/g$.

6. The method according to claim 1, wherein the coated amount of the silica layer is from 0.1 to 3 $g/m^2$.

7. A method for preparing a coated paper, which comprises coating a silica coating solution on a pseudo-boehmite layer of a paper substrate having the pseudo-boehmite layer thereon, and then pressing a heated flat and smooth die to the silica coated layer to form a silica layer having the surface flattened, wherein the formed silica layer has a 60° specular glossiness of at least 30% as stipulated in ISO 2813.

8. The method according to claim 7, wherein the pseudo-boehmite layer has an average pore radius of from 3 to 15 nm and a pore volume of from 0.5 to 1.0 $cm^3/g$.

9. The method according to claim 7, wherein the coated amount of pseudo-boehmite layer is from 5 to 30 $g/m^2$.

10. The method according to claim 7, wherein the silica layer comprises silica particles having an average particle size of from 20 to 200 nm bound by a binder.

11. The method according to claim 7, wherein the silica layer has an average pore radius of from 5 to 20 nm and a pore volume of from 0.5 to 1.5 $cm^3/g$.

12. The method according to claim 7, wherein the coated amount of the silica layer is from 0.1 to 3 $g/m^2$.

* * * * *